United States Patent [19]

Elkins et al.

[11] Patent Number: 5,002,724
[45] Date of Patent: Mar. 26, 1991

[54] UPPER TIE PLATE FOR BOILING WATER NUCLEAR REACTOR

[75] Inventors: Robert B. Elkins; Bruce Matzner; Michael V. Curulla, all of San Jose, Calif.

[73] Assignee: General Electric Company, San Jose, Calif.

[21] Appl. No.: 399,107

[22] Filed: Aug. 28, 1989

[51] Int. Cl.⁵ .................................................. G21C 3/34
[52] U.S. Cl. ................................... 376/435; 376/440; 376/444; 376/446
[58] Field of Search ............... 376/440, 446, 435, 443, 376/439, 444

[56] References Cited

U.S. PATENT DOCUMENTS

| | | | |
|---|---|---|---|
| 4,357,298 | 11/1982 | Wolters | 376/441 |
| 4,560,532 | 12/1985 | Barry | 376/434 |
| 4,624,829 | 11/1986 | Jackson | 376/448 |
| 4,663,118 | 5/1987 | Nelson | 376/445 |
| 4,675,154 | 6/1987 | Nelson | 376/444 |
| 4,749,543 | 6/1988 | Crowther | 376/443 |

Primary Examiner—Donald P. Walsh
Attorney, Agent, or Firm—Robert R. Schroeder

[57] ABSTRACT

An improved upper tie plate is disclosed in a fuel bundle for a boiling water nuclear reactor. The tie plate resides in a fuel bundle including an upper tie plate, a lower tie plate, a matrix of sealed fuel rods supported therebetween, and a surrounding channel. Both the lower tie plate and the improved upper tie plate have two functions; they support the fuel rods in vertical upstanding relation between the tie plates and interior of the channel and permit the passage of moderating coolant through the channel from the bottom of the channel to the top of the channel. This moderating coolant enters through the lower tie plate in the liquid form, passes into the matrix of upstanding fuel rods where steam is generated and exits outwardly through the improved upper tie plate as a water steam mixture at the top of the fuel bundle. The improvement includes the support of the channel directly from the fuel bundle lifting bail for transmission of load directly to the bail instead of a cantilevered support through the tie plate. This direct support enables cutting away a portion of the matrix overlying the fuel rods for reduction of pressure drop in the escaping steam/water phase from the fuel bundle. Additionally, this alignment enables raising of the points of tie plate support for longer fuel rod length. Improved fuel bundle performance results.

4 Claims, 4 Drawing Sheets

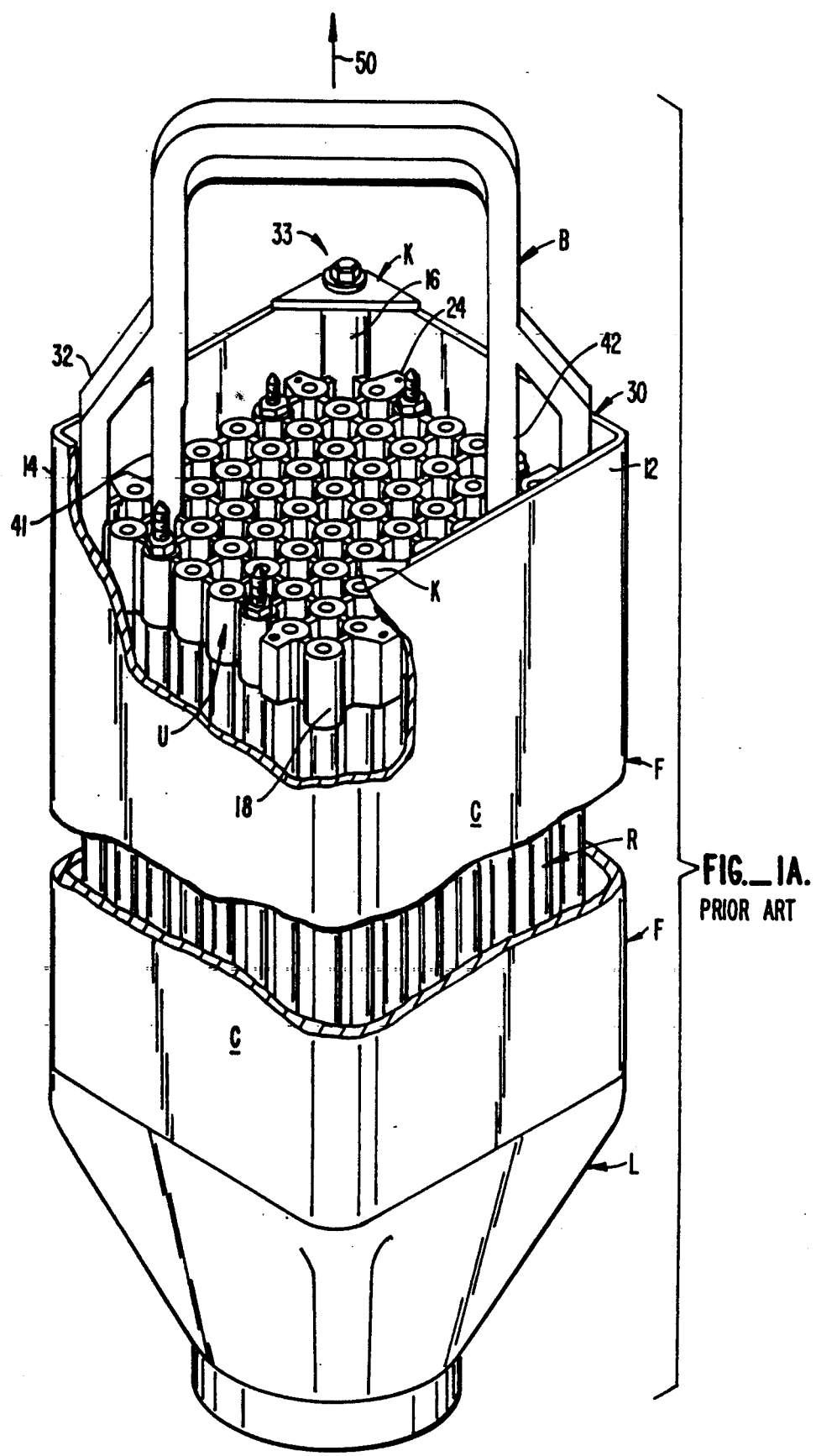
FIG._1A.
PRIOR ART

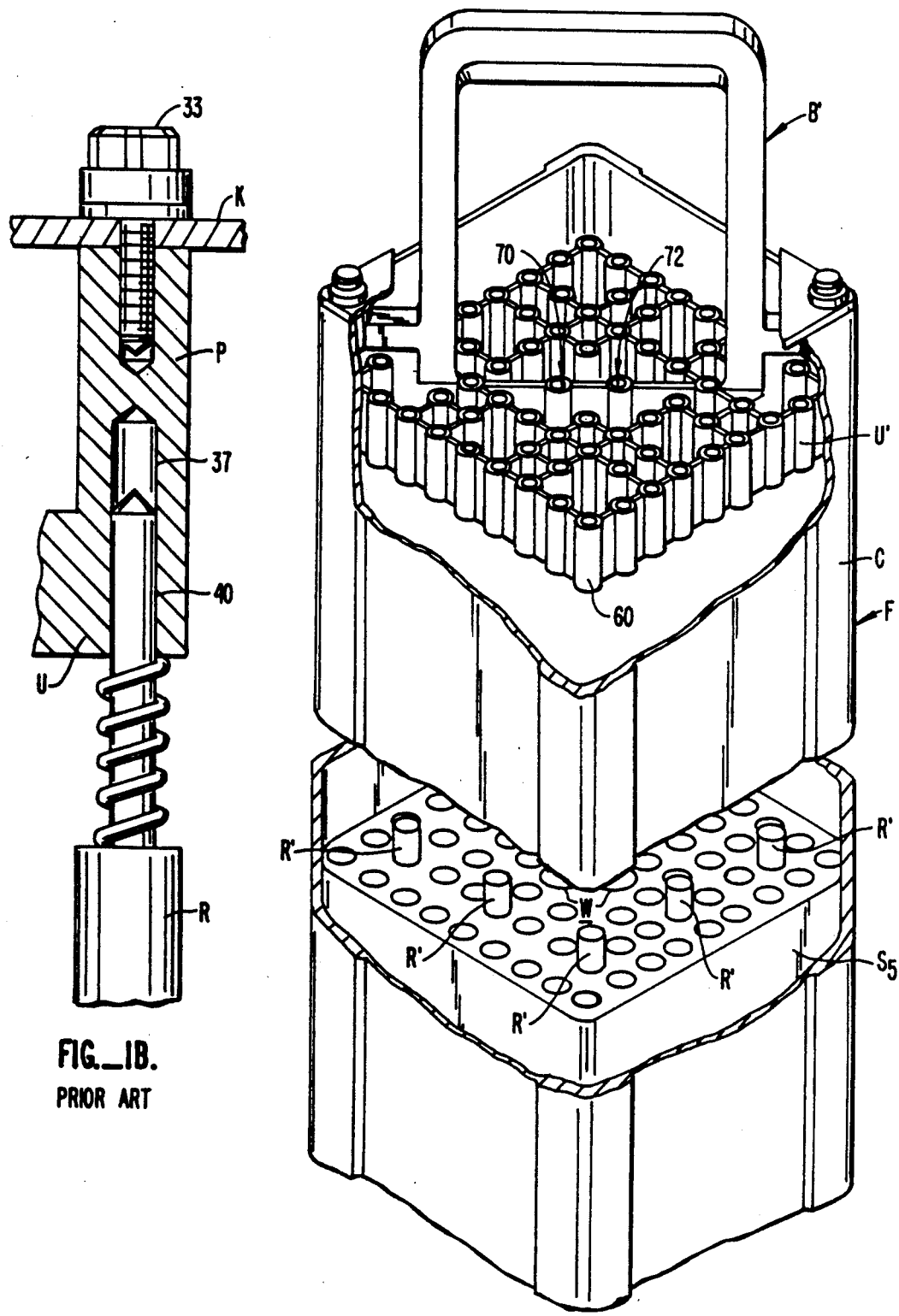
FIG._1B.
PRIOR ART
FIG._2.

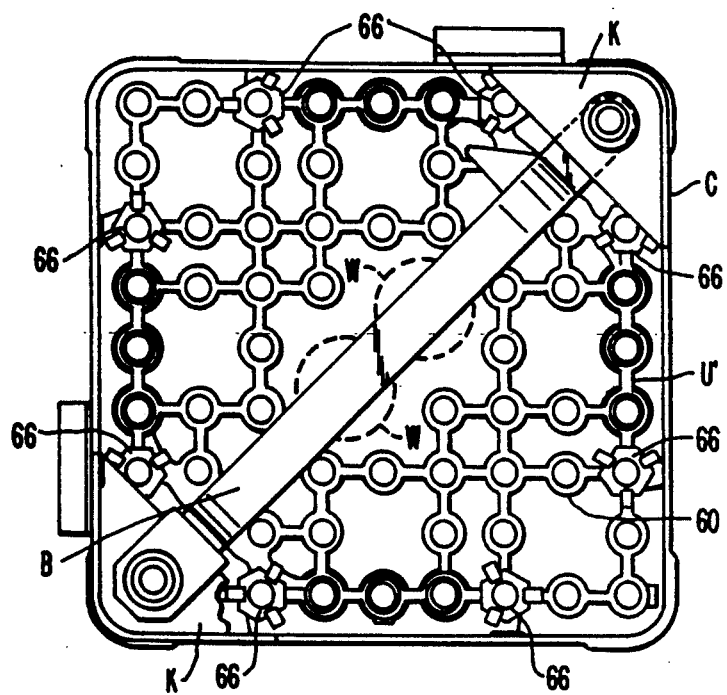
FIG._3A.
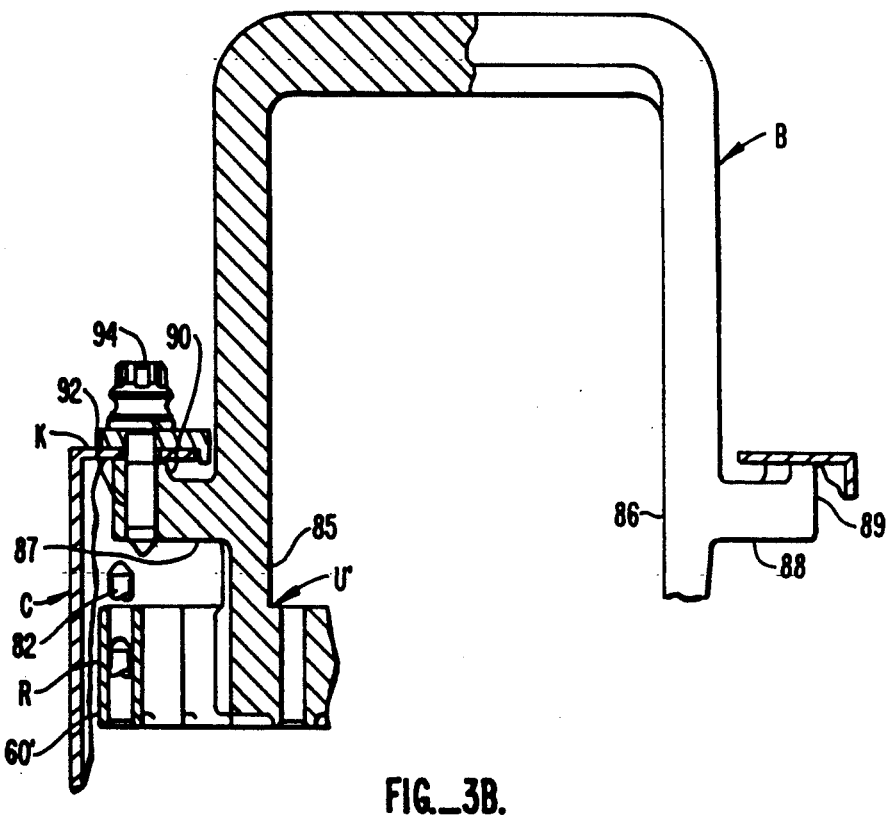
FIG._3B.

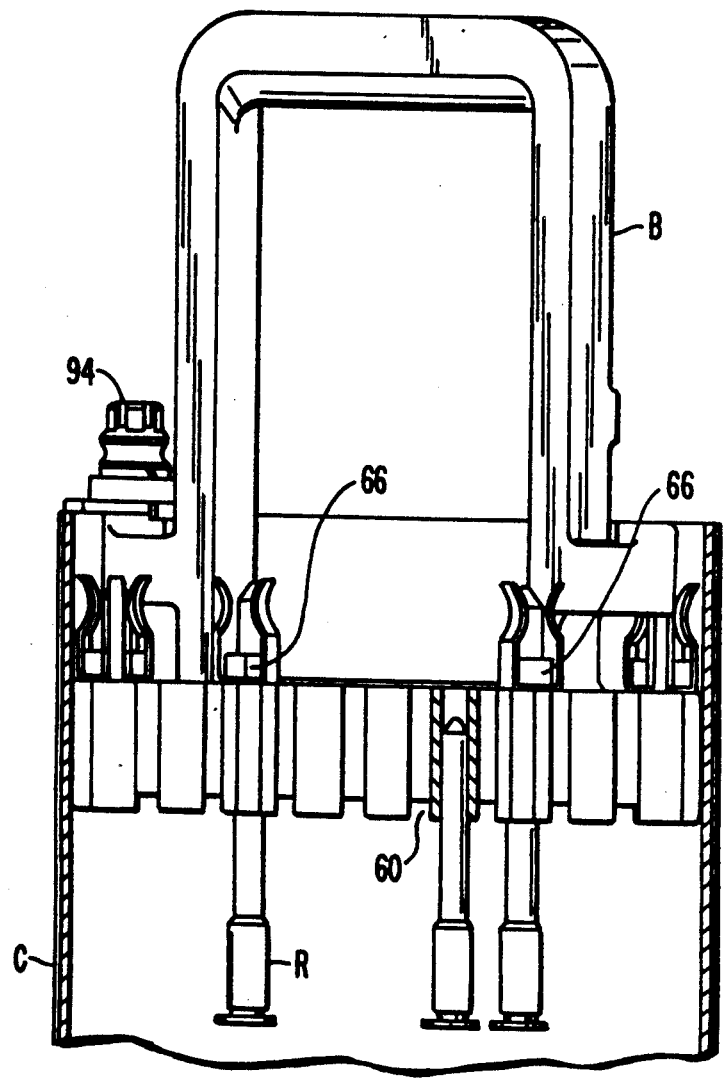
FIG._3C.

UPPER TIE PLATE FOR BOILING WATER NUCLEAR REACTOR

This invention relates to fuel bundles for boiling water nuclear reactors. More particularly, an improved upper tie plate for a boiling water nuclear reactor fuel bundle is disclosed.

BACKGROUND OF THE INVENTION

Prior art fuel bundles for boiling water nuclear reactors have standard construction. This construction includes a lower tie plate, an upper tie plate, and a matrix of sealed fuel rods supported therebetween. These fuel rods contain nuclear fuel pellets in sealed containment for supporting the required critical reaction for the generation of steam.

The entire fuel bundle assembly between the lower tie plate and the upper tie plate is surrounded by a flow constricting channel. This channel is commonly square in cross section and made of metal (preferably an alloy called zircalloy).

Water moderator passes from the bottom of the fuel bundle to the top of the fuel bundle. Water enters through the lower tie plate within the channel and passes between the upstanding fuel rods. Water and generated steam exit from within the channel between the fuel rods and out through the upper tie plate.

Both the lower tie plate and the upper tie plate have two well known functions.

First, they are the support points for the sealed fuel rods in vertical and upstanding side-by-side relation. Typically, the upper tie plate forms an overlying matrix of fuel rod support points. Into about eight of these support points are placed correspondingly male threaded tie rod end fittings. The tie rods—containing fuel like the remainder of the fuel rods—are threaded at their lower end for corresponding attachment to the lower tie plate.

Likewise, the lower tie plate forms an underlying matrix of fuel rod support points. These underlying support points correspond for the most part to the overlying support points of the upper tie plate. About eight of these support points are threaded with female apertures. They correspond to the overlying apertures in the upper tie plates. Into these threaded support points in the lower tie plates are placed the lower threaded ends of the so-called tie rods. Thus the two tie plates are tied together with the tie rods.

A fuel bundle channel surrounds the fuel rods between the tie plates. This channel confines the required moderator coolant flow to a flow path which is restricted between the tie plates.

The second function of the tie plates is to define a matrix of apertures for permitting fluid flow into and out of the fuel bundle. Specifically, the lower tie plate defines between its discrete fuel rods support points a first matrix of apertures for permitting the inflow of water coolant. This coolant functions in the capacity of moderating or slowing down reaction produced fast neutrons to produce reaction continuing slow or thermal neutrons. At the same time, as the coolant passes upwardly through the fuel bundle within the channel, a portion of the coolant is turned into steam. This steam——and the coolant that is not turned into steam and remains in the liquid phase—must pass out through the upper tie plate. Consequently, the upper tie plate forms its own matrix of apertures in between its matrix of fuel rod support points. This upper tie plate matrix of apertures permits the outflow of the two phase steam water mixture from the fuel bundle.

The fuel bundle must be periodically replaced and/or inspected during so-called "outages" of a reactor. These outages occur when the central steam generating core of a nuclear reactor has its overlying components removed to provide access through shielding water to the core. During such "outages" sections of the reactor vessel core are removed, inspected, and/or replaced. The core, submerged in a radiation quenching bath of water, has the fuel bundles to be replaced for inspection removed by remotely grasping the fuel bundle at a handle or bail. Needless to say, the bail must define, at the top of the fuel bundle, a support point for the entire weight of the fuel bundle in a depending relationship when the fuel bundle is removed. At the same time, the bail must occupy a minimum dimension so as not to interfere with the active lengths of the fuel rods. Thus the bail is held to a clearance to permit bundle handling equipment to grasp the bundle at the bail.

Once the fuel bundle is supported at the bail the entire weight of the fuel bundle is carried through the bail. This weight includes the weight of the fuel rods, the weight of the upper tie plate, the weight of the lower tie plate and the weight of the surrounding channel.

The support of the flow confining channel has heretofore been provided through the upper tie plate. Typically, the lifting bail has been fastened to the upper tie plate at one set of opposite corners on the square sectioned upper tie plate. The channel has been supported at the upper tie plate at the diagonally opposite upper tie plate corners. Thus, during lifting of the fuel bundle from the core, the load of the surrounding channel has passed from the channel to the corners of the tie plate, across the upper tie plate itself in a cantilevered support, and then through the handle or lifting bail to the point of attachment at the tie plate. Naturally, it has been required to build the upper tie plate strong enough to transmit this load.

The construction of the upper tie plate has been further constrained by the requirement that provision be made for in-service life differential expansion of the supported fuel rods. Specifically, such fuel rods during their inservice life become longer by differing amounts. This elongation is due to many factors including radiation induced "growth" or expansion of the fuel rods.

In the prior art, the required dimension for this necessary differential fuel rod expansion had to be provided directly under the points of channel clip attachment to the upper tie plate. Consequently, the points of channel clip attachment and the underlying dimension required for in-service fuel rod differential expansion have interfered one with another. This interference has been solved in the prior art by reducing the overall length of the fuel rods confined within the fuel bundle. While this provides an adequate space for in-service life fuel rod differential expansion, it forced the fuel rod design at the top of fuel bundle to be constrained by the shorter overall fuel rod length.

The reader will understand that substantial portions of the background section herein where they refer to the prior art are selected with the hindsight of the following disclosure. It will be appreciated that the literal maze of design considerations which enter into overall fuel bundle design have been selected only to disclose the relevant considerations which follow from the below disclosed invention.

RELATED ART

In a patent application entitled Two-Phase Pressure Drop Reduction BWR Assembly Design filed Apr. 4, 1988 as Ser. No. 176,975, a fuel bundle using partial length rods is described. In the preferred embodiment that follows herein the reader will see that the improved upper tie plate utilized with this invention finds its preferred embodiment with the partial length rods of this disclosure. In particular, the fuel bundle disclosed in the above-entitled application includes a matrix of fuel rods in a 9×9 array. As will hereinafter become more apparent, partial length rods are arrayed in this disclosure with each full length rod being adjacent a partial length rod or a central water tube. Consequently, in that disclosure, the omission from the upper tie plate of matrix locations overlying the partial length fuel rod was disclosed.

SUMMARY OF THE INVENTION

An improved upper tie plate is disclosed in a fuel bundle for a boiling water nuclear reactor. The tie plate resides in a fuel bundle including an upper tie plate, a lower tie plate, a matrix of sealed fuel rods supported therebetween, and a surrounding channel. Both the lower tie plate and the improved upper tie plate have two functions; they support the fuel rods in vertical upstanding relation between the tie plates and interior of the channel and permit the passage of moderating coolant through the channel from the bottom of the channel to the top of the channel. This moderating coolant enters through the lower tie plate in the liquid form, passes into the matrix of upstanding fuel rods where steam is generated and exits outwardly through the improved upper tie plate as a water steam mixture at the top of the fuel bundle. The improvement includes the support of the channel directly from the fuel bundle lifting bail for transmission of load directly to the bail instead of a cantilevered support through the tie plate. This direct support enables cutting away a portion of the matrix overlying the fuel rods for reduction of pressure drop in the escaping steam/water phase from the fuel bundle. Additionally, this alignment enables raising of the points of tie plate support for longer fuel rod length. Improved fuel bundle performance results.

OTHER OBJECTS, FEATURES AND ADVANTAGES

An object to this invention is to disclose an upper tie plate with decreased area to permit the outflow of a water steam mixture with reduced pressure drop across the top of a fuel bundle. Accordingly, an upper tie plate forms a support grid for tie rods and upstanding fuel rods. The grid is arrayed in a 9×9 array with locations overlying partial length fuel rods omitted. A boss integral to the upper tie plate directly suspends and supports the fuel bundle surrounding channel from the bails ends. Consequently, the mass of the tie plate is reduced by that amount of additional material necessary for the cantilevered support of the fuel channel. The cross sectional area of the upper tie plate is correspondingly reduced. Outflowing steam and water passes outwardly with lower pressure drop across the upper tie plate.

A further object is to disclose an upper tie plate and exposed fuel bundle handling bail which allows longer fuel rod length. In accordance with this aspect of the invention, the bail just above its point of attachment to the tie plate has two upwardly projecting bosses to support and attach the channel. The transverse position of these upwardly projecting bosses reduce or eliminate interference with differentially expanding fuel rods thus allowing the elevation of the upper tie plate likewise to be raised and corresponding fuel rods lengthened. A fuel bundle is disclosed in which overall fuel rod length can be increased.

An advantage of the longer fuel rod length is that flexibility is imparted in fuel design. This flexibility can be used to increase the fuel loading in the rod to enhance fuel cycle costs, increase the gas plenum length for accommodation of fission gases evolved, increase the allowance for differential fuel rod growth, or some combination of these factors.

BRIEF DESCRIPTION OF THE DRAWINGS

Other objects, features and advantages of this invention will become more apparent after referring to the following specification and attached drawings in which;

FIG. 1A is a perspective view of the upper portion of a prior art fuel bundle at the upper tie plate illustrating the attachment of the prior art fuel bundle bail, the transmission of the channel load from the posts of the upper tie plate through the upper tie plate to the handle intersections at the remote opposite corners of the upper tie plate, and the underlying accommodation of a spatial interval necessary for fuel rod expansion and attachment of the fuel channel clips to the upper tie plate;

FIG. 1B is a detail of the prior art upper tie plate at the point of channel clip attachment;

FIG. 2 is a perspective view of the improved tie plate of this invention fastened at the upper portion of a fuel bundle illustrating the attachment of the fuel bundle channel directly from the bosses on the bail, and the direct transmission of the load of the fuel bundle channel to the handle or bail during fuel bundle lifting and the improved reduced underlying cross section of the upper tie plate; and FIGS. 3A, 3B and 3C are respective plan, side elevation, and handle elevation views of the improved tie plate and bail illustrating the longer accommodated fuel rod length and reduced upper tie plate section.

Referring to FIG. 1 a typical fuel bundle F is shown. The fuel bundle here illustrated is shown in a lifted disposition away from a reactor core. The fuel bundle includes a lower tie plate L, a conventional upper tie plate U, which conventional upper tie plate U includes a bail B attached to the upper tie plate at remote, opposite corners. In the particular embodiment here illustrated, fuel rods R are arrayed in a 8×8 array. The fuel rods R extend the entire distance from the lower tie plate L to the upper tie plate U. Certain of the fuel rods (known as the rods) are threaded at both ends, are threadably engaged in threaded apertures in the lower tie plate L, are likewise threadably engaged by correspondingly threaded hexagon nuts above the upper tie plate U and thereby fasten the mass of vertically upstanding fuel rods R in a unitary configuration. Approximately eight so-called tie rods form the points of attachment between the upper and lower tie plates; the remainder of the fuel rods—over 50 in number, are captured between the tie plates in apertures dimensioned to entrap the fuel rods therebetween and permit required in-service life expansion.

The fuel bundle is preferably square in cross section. It is surrounded by a correspondingly square sectioned channel C. It is required that channel C fit and attach to the upper tie plate U.

To this end, two clips K are provided. A first clip K is diagonally opposite the handle at a corner 16. A second clip K shown in broken lines is on the corner 18 opposite corner 16. As can be seen, the handle attaches at respective corners 12 and 14. Typically one of the clips at corner 16 is fastened to the post P of the upper tie plate U by bolt 33.

Immediately underlying bolt 33 there is provided a depending annulus 37. Depending annulus allows a spatial interval between an underlying fuel rod 40 and the lower most portion of the bolt.

It will known to those skilled in the reactor arts that during the in-service life of the fuel bundle, upstanding fuel rods R such as rod 40 may expand in length relative to the bundle. This differential expansion in length is largely due to the interaction between fuel pellets and cladding. It is necessary, because of the attachment of the handle 30 at bolt 33, to provide an excursion distance. This distance is provided at annulus 37 and permits the upper end of rod 40 to move towards and away from the attachment bolt 33 at the upper tie plate.

Having set forth in summary fashion the construction of the prior art tie plate, attention may now be directed to forces encountered when the fuel bundle is lifted by the bail B.

When bail B is lifted upwardly as indicated by vector 50, support of the channel must occur. Typically, the weight of the channel is transmitted from the corners 16, 18 across the mass of the upper tie plate U. This transmission occurs to the points of handle attachment at 30, 32, 41 and 42 to the upper tie plate U.

Total weight of the channel is in the order of 100 lbs. Consequently, and because of the considerable distance across the tie plate which the cantilever must occur, the section of the upper tie plate U must be strong enough for transmission of the cantilevered load. The transmission of the cantilevered load requires increased thickness in the upper tie plate. Correspondingly this increased thickness in the upper tie plate presents resistance to water and steam outflowing from the fuel bundle. This increased flow resistance unfortunately increases the so-called two phase pressure drop at the top of the fuel bundle, a particularly undesirable characteristic in fuel bundle design.

Having set forth the prior art, the preferred embodiment of this invention may now be discussed.

Referring to FIG. 2 the improved upper tie plate U' of this invention is illustrated. In order to understand the full import of the improved upper tie plate, reference will first be made to certain partial length fuel rods R' within the fuel bundle. Thereafter, the matrix of the upper tie plate U' corresponding to the partial length fuel rods R' will be set forth. As an additional consideration, the configuration of the large central water rods W will be set forth. Finally, the attachment of the channel C to the improved bail B' will be discussed. Intermittent reference will be made to the respective plan and side elevation views of FIGS. 3A, 3B, and 3C.

In a related disclosure entitled Two-Phase Pressure Drop Reduction BWR Assembly Design, U.S. patent application Ser. No. 176,975, filed Apr. 4, 1988, a partial length fuel rod is set forth. The partial length fuel rod extends approximately ⅔rods the length of the fuel bundle F. Preferably, the fuel rods in such a fuel bundle F are arrayed in a 9×9 matrix.

Distributed along the length of the fuel bundle F are seven spacers. For the convenience of the viewer and in FIG. 2 herein, spacer S5, the fifth spacer from the bottom of the fuel bundle F is illustrated.

This spacer S5 typically is the point of termination of the partial length fuel rods R'.

It has been found preferable in the 9×9 array here indicated to place the partial length fuel rods R' at least one row inwardly from the sides of the fuel channel C. Accordingly, and all around the periphery of the 9×9 array are full length fuel rods. These full length fuel rods have been terminated for the convenience of the viewer at spacer S5 on that side of the perspective view that is to and towards the viewer. This termination enables the viewer to see the second row inwardly to and towards the center of the fuel bundle. It is in this second row that the partial length fuel rods R' are placed.

Examining the second row inwardly the viewer can see that there are three partial length rods R' in the second row. Such an arrangement places each full length rod adjacent a partial length rod.

As is set forth in the related disclosure, numerous advantages are realized. Among these advantages are the lattice configuration of the upper tie plate U' which lattice configuration will now be set forth.

Referring to the upper tie plate U' it can be seen that a 9×9 array of fuel rods is anticipated. Specifically, ferrules 60 are in a continuous 9×9 array around the periphery of the upper tie plate U'.

Taking the second row in any direction, the position of the partial length fuel rods can be described. Specifically, and at lattice positions 2,2 (second row, second column); 2,5; and 2,8, the upper tie plate U' will be seen to overlie a partial length rod R'. This being the case, the lattice position at these locations remains unoccupied.

The reader will understand that this nonoccupancy is a result of the partial length fuel rods R' and the invention directly flowing therefrom. It does not follow from this disclosure.

Additionally, such fuel bundles include large central water rods W. Ferrules to receive the respective water rods ends 70 and 72 are shown in FIG. 2.

Using a conventional lattice description, it can be seen that ferrule positions 4,5; 4,6; 5,4; 5,5; 5,6; and 6,4; 6,5 are replaced by 2 ferrules at 70 and 72.

Having completed the description of the preferred embodiment utilizing partial length fuel rods, the construction of the upper tie plate can now be set forth.

Referring to FIG. 3A an upper tie plate U' in accordance with this invention is illustrated.

First, the tie plate includes a plurality of rod support location 60. Rod support location 60 overlies each of the full length rods R and water rods W utilized with this invention. As has been explained, the matrix locations overlying the partial length rods are empty and the 7 matrix locations overlying the water rods are occupied by only 2 ferrules.

Second, the upper tie plate includes tie rod locations 66. There are eight such tie rod locations. These tie rod position locations being at 1,3; 1,7; 3,1; 3,9; 7,1; 7,9; and 9,3; and 9,7. It is these rods which tie the lower tie plate L and the upper tie plate U'.

Third, and referring to the sections of FIG. 3B and FIG. 3C, the attachment of handle or bail B to the channel clip K and the upper tie plate U' can be set forth.

First, bail B is conventionally cast as a unitary element to the upper tie plate U'. It can be seen that the lower portions of the bail at 85 and 86 are directly attached to the tie plate.

Second, and protruding out from the bail at respective arms 88 on one side and arm 87 on the opposite side are channel supporting bosses 89, 90. These members define therethrough a threaded aperture 92 for receiving a bolt 94. Bolt 94 directly secures clip K which is conventionally affixed to the sides of channel C. Thus it can be seen that the loading of the channel C passes directly through the clip K to the bail B at the two sides 85, 86 through the respective arms 87, 88. Transmission of this loading through the tie plate no longer occurs.

It can also be seen that the position of bolt 94 overlies, but is horizontally offset from the corner matrix position 60'. Thus should the fuel rod confined at 60' undertake excursion, as to the position indicated at 92, interference with the bolt 94 will be reduced or not occur.

Since such noninterference occurs, it can be appreciated that the individual fuel rods R can be made longer with the given design than those of the prior art.

We claim:

1. In a fuel bundle having a lower tie plate disposed in a plane across said fuel bundle defining a matrix of fuel rod support locations for the support in side-by-side relation of a matrix of fuel rods in vertical upstanding relation, said lower tie plate further defining a second matrix of coolant flow apertures in noninterfering relationship with said first fluid matrix for permitting moderating coolant to flow through said lower tie plate and upwardly between said fuel rods;

an upper tie plate disposed in a plane across said fuel bundle defining a corresponding matrix of fuel rod support locations for the support in side-by-side relation of said matrix of fuel rods in vertical upstanding relation, said upper tie plate further defining a second matrix of coolant flow apertures in non-interfering relationship with said first matrix for permitting moderating coolant and generated steam to flow from said fuel rods and through said upper tie plate;

a matrix of fuel rods between said upper and lower tie plates registered between said tie plates in corresponding matrix locations at the support points of said tie plates;

a plurality of said fuel rods functioning to tie said upper and lower tie plates together;

a channel supported from said upper portion of said fuel bundle and depending to said lower tie plate so as to define a confined fluid path from said lower tie plate, through said matrix of fuel rods and out said upper tie plate;

a bail attached to said upper tie plate for permitting the raising and lowering of said fuel bundle by grasping of said bail, the improvement to said upper tie plate comprising;

first and second support points attached directly to said bail above the plane of said upper tie plate;

said support points disposed for attachment directly to said channel from said bail whereby said loading of said channel passes directly to said bail independent of said tie plate thereby enabling decreased loading of said tie plate by said channel with corresponding decreased section of said upper tie plate to enable corresponding decreased resistance to steam and coolant flow passing upward from said channel through said upper tie plate.

2. The invention of claim 1 and including ferrule locations in said matrix of said upper tie plate offset from said channel support points, said ferrule locations enabling a longitudinal excursion of an end of a supported rod underlying said channel support point.

3. The invention of claim 1 and including a plurality of partial length rods extending from said lower tie plate to and towards said upper tie plate and terminating short of said upper tie plate;

a plurality of matrix locations in said upper tie plate being vacant at locations corresponding to said partial length rods.

4. The invention of claim 3 and including at least one water rod associated with a plurality of said matrix locations extending from said lower tie plate to and towards said upper tie plate and terminating at said upper tie plate mating with a single ferrule;

all of said matrix locations in said upper tie plate being vacant at the corresponding matrix locations associated with said water rod and replaced by said single ferrule.

* * * * *